(12) United States Patent
Young et al.

(10) Patent No.: US 10,953,574 B2
(45) Date of Patent: *Mar. 23, 2021

(54) POLYMERIC MULTILAYER FILM

(71) Applicant: 3M INNOVATIVE PROPERTIES COMPANY, St. Paul, MN (US)

(72) Inventors: Jacob D. Young, St. Paul, MN (US); Jeffrey O. Emslander, City of Grant, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/463,903

(22) PCT Filed: Dec. 4, 2017

(86) PCT No.: PCT/US2017/064400
§ 371 (c)(1),
(2) Date: May 24, 2019

(87) PCT Pub. No.: WO2018/106559
PCT Pub. Date: Jun. 14, 2018

(65) Prior Publication Data
US 2019/0375188 A1    Dec. 12, 2019

Related U.S. Application Data

(60) Provisional application No. 62/432,361, filed on Dec. 9, 2016.

(51) Int. Cl.
*B32B 3/00* (2006.01)
*C09J 7/38* (2018.01)
(Continued)

(52) U.S. Cl.
CPC ............ *B29C 39/123* (2013.01); *B29C 48/00* (2019.02); *B29C 48/0012* (2019.02);
(Continued)

(58) Field of Classification Search
CPC ....... B32B 27/20; B32B 27/302; B32B 27/32; B32B 27/00; B32B 27/40; B32B 27/304;
(Continued)

(56) References Cited

U.S. PATENT DOCUMENTS

| | | |
|---|---|---|
| 4,379,806 A | 4/1983 | Korpman |
| 5,217,666 A | 6/1993 | Tamaru |

(Continued)

FOREIGN PATENT DOCUMENTS

| | | |
|---|---|---|
| EP | 2535388 | 12/2012 |
| WO | WO 1999-014264 | 3/1999 |

(Continued)

OTHER PUBLICATIONS

International Search Report for PCT International Application No. PCT/US2017/064396, dated Jan. 30, 2018, 4 pages.

(Continued)

*Primary Examiner* — Patricia L. Nordmeyer

(57) ABSTRACT

Polymeric multilayer film comprising at least two adjacent layers each exhibiting a random network of strands and connective regions. The polymeric multilayer films are useful, for example, for tape and graphic articles.

13 Claims, 6 Drawing Sheets

(51) Int. Cl.
| | | |
|---|---|---|
| *B32B 5/18* | (2006.01) | |
| *B32B 27/06* | (2006.01) | |
| *B32B 5/02* | (2006.01) | |
| *B32B 5/26* | (2006.01) | |
| *B32B 7/06* | (2019.01) | |
| *B32B 7/12* | (2006.01) | |
| *B29C 39/12* | (2006.01) | |
| *B29C 48/00* | (2019.01) | |
| *B29C 48/21* | (2019.01) | |
| *B32B 5/32* | (2006.01) | |
| *B29C 48/08* | (2019.01) | |
| *B29C 48/335* | (2019.01) | |
| *C09J 7/20* | (2018.01) | |
| *B29K 105/00* | (2006.01) | |
| *B29L 9/00* | (2006.01) | |
| *B29L 23/00* | (2006.01) | |
| *B29C 48/18* | (2019.01) | |
| *B29C 48/28* | (2019.01) | |
| *B29C 48/10* | (2019.01) | |
| *B29C 48/49* | (2019.01) | |

(52) U.S. Cl.
CPC ............ *B29C 48/08* (2019.02); *B29C 48/21* (2019.02); *B29C 48/335* (2019.02); *B32B 3/00* (2013.01); *B32B 5/022* (2013.01); *B32B 5/18* (2013.01); *B32B 5/26* (2013.01); *B32B 5/32* (2013.01); *B32B 7/06* (2013.01); *B32B 7/12* (2013.01); *B32B 27/065* (2013.01); *C09J 7/20* (2018.01); *C09J 7/38* (2018.01); *B29C 48/0018* (2019.02); *B29C 48/0019* (2019.02); *B29C 48/0022* (2019.02); *B29C 48/10* (2019.02); *B29C 48/185* (2019.02); *B29C 48/28* (2019.02); *B29C 48/49* (2019.02); *B29K 2023/06* (2013.01); *B29K 2105/0097* (2013.01); *B29L 2009/00* (2013.01); *B29L 2023/001* (2013.01); *B32B 2266/025* (2013.01); *B32B 2307/51* (2013.01); *B32B 2405/00* (2013.01); *Y10T 428/14* (2015.01)

(58) Field of Classification Search
CPC ..... B32B 27/36; B32B 27/365; B32B 27/065; B32B 27/08; B32B 3/00; B32B 25/14; B32B 25/16; B32B 25/08; B32B 25/12; B32B 5/32; B32B 5/18; B32B 5/20; B32B 7/12; B32B 2307/5825; B32B 2307/306; B32B 2307/536; B32B 2307/732; B32B 2307/51; B32B 2307/728; B32B 2307/554; B32B 2307/40; B32B 2405/00; B32B 2264/105; B32B 2451/00; B32B 2266/025; B29C 39/123; B29C 48/49; B29C 48/00; B29C 48/10; B29C 48/0012; B29C 48/30; B29C 48/21; B29C 48/0018; B29C 48/335; B29C 48/0022; B29C 48/28; B29C 48/185; B29C 48/0019; B29C 2793/0063; C09J 7/38; B29D 7/01; B29D 2009/00; B29K 2023/06; B29K 2023/0616; B29K 2105/0097; B29L 2009/00; B29L 2023/001
See application file for complete search history.

(56) References Cited

U.S. PATENT DOCUMENTS

| | | |
|---|---|---|
| 6,171,689 B1 * | 1/2001 | Kaytor .................. B29C 67/202 428/315.5 |
| 6,316,120 B1 | 11/2001 | Emslander |
| 6,777,053 B1 | 8/2004 | Guenter |
| 6,921,729 B2 | 7/2005 | Schwab |
| 8,480,836 B2 | 7/2013 | Orlych |
| 8,563,621 B2 | 10/2013 | Lapierre |
| 8,632,706 B2 | 1/2014 | Orlych |
| 8,865,038 B2 | 10/2014 | Orlych |
| 9,028,732 B2 | 5/2015 | Sullivan |
| 9,187,678 B2 | 11/2015 | Boardman |
| 2001/0034173 A1 | 10/2001 | Zimmermann |
| 2005/0056973 A1 | 3/2005 | Ooyama |
| 2009/0186183 A1 | 7/2009 | Michel |
| 2012/0028524 A1 | 2/2012 | Peloquin |
| 2012/0070661 A1 | 3/2012 | Ikishima |
| 2012/0172214 A1 | 7/2012 | Thomas |
| 2013/0324651 A1 | 12/2013 | Joly |
| 2016/0082621 A1 | 3/2016 | Li |
| 2019/0375184 A1 * | 12/2019 | Emslander .............. B32B 27/08 |
| 2019/0375186 A1 * | 12/2019 | Emslander .............. B32B 33/00 |
| 2019/0389173 A1 * | 12/2019 | Young .................... B32B 27/08 |

FOREIGN PATENT DOCUMENTS

| | | |
|---|---|---|
| WO | WO 2000-042095 | 7/2000 |
| WO | WO 2005-068177 | 7/2005 |
| WO | WO 2007-087281 | 8/2007 |
| WO | WO 2014-100551 | 6/2014 |
| WO | WO 2014-100580 | 6/2014 |
| WO | WO 2014-199268 | 12/2014 |
| WO | WO 2015-200655 | 12/2015 |
| WO | WO 2015-200657 | 12/2015 |
| WO | WO 2015-200669 | 12/2015 |
| WO | WO 2016-137793 | 9/2016 |
| WO | WO 2018-106557 | 6/2018 |
| WO | WO 2018-106558 | 6/2018 |
| WO | WO 2018-106560 | 6/2018 |
| WO | WO 2018-106561 | 6/2018 |

OTHER PUBLICATIONS

International Search Report for PCT International Application No. PCT/US2017/064398, dated Jan. 26, 2018, 4 pages.
International Search Report for PCT International Application No. PCT/US2017/064400, dated Mar. 27, 2018, 4 pages.
International Search Report for PCT International Application No. PCT/US2017/064401, dated Feb. 14, 2018, 5 pages.
International Search Report for PCT International Application No. PCT/US2017/064403, dated Jan. 30, 2018, 4 pages.

* cited by examiner

POLYMERIC MULTILAYER FILM

CROSS REFERENCE TO RELATED APPLICATION

This application is a national stage filing under 35 U.S.C. 371 of PCT/US2017/064400, filed Dec. 4, 2017, which claims the benefit of U.S. Provisional Application No. 62/432361, filed Dec. 9, 2016, the disclosure of which is incorporated by reference in its/their entirety herein.

BACKGROUND

There is a desire to make polymeric films and film composites with structures and/or textures to provide additional functionality. Such functionality may include optical effects, and/or increased liquid absorption or solid retention due to the increased surface area of a texture surface vs. a smooth surface.

Textures or structures can be added to polymeric films, for example, via casting molten polymer onto a patterned chill roll. This requires the use of a specific patterned roll for each desired texture or structured film. Alternatively, a non-patterned polymeric film can be embossed after the film-making process by reheating at least a portion of the film surface and passing between a high-pressure nip with at least one of the rollers having the reverse of the desired pattern. This technique requires an additional process step and requires the manufacture and use of a patterned roll for each desired final texture or structure.

Textured films can also be produced coating or laminating a polymeric layer onto a nonwoven web. The nonwoven layer provides the desired texture or structure while the film layer provides other functionality such as a barrier or decorative layer. This process requires multiple process steps to produce the desired end product—producing a non-woven web and at least a second step to provide the lamination or coating of the polymer layer onto the nonwoven.

There remains a need to produce a structured and/or textured polymeric film or film composite that can be produced without the need for unique patterned rolls or without the need for a secondary process to produce the texture or structure.

SUMMARY

The present disclosure describes a polymeric multilayer film comprising at least two adjacent polymeric layers, each exhibiting a random network of strands (in some embodiments, elongated strands) and connective regions (the random network has a first optical density and the connective regions has a second optical density, wherein the first optical density is greater than the second optical density; in some embodiments, there are openings in at least some of the connective regions, whereas in some embodiments there are no openings (i.e., no through holes) in the layer). In some embodiments, at least 3, 4, 5, 6, or even at least 7 polymeric layers, each exhibit a random network of strands and connective regions. In some embodiments, all the layers, or some of the layers are adjacent another layer exhibit a random network of strands and connective regions.

Embodiments of polymeric multilayer films described herein are useful, for example, for tape and graphic articles.

DETAILED DESCRIPTION

The present disclosure describes a polymeric multilayer film comprising at least two adjacent polymeric layers, each exhibiting a random network of strands (in some embodiments, elongated strands) and connective regions (the random network has a first optical density and the connective regions has a second optical density, wherein the first optical density is greater than the second optical density; in some embodiments, there are openings in at least some of the connective regions, whereas in some embodiments there are no openings (i.e., no through holes) in the layer). In some embodiments, at least 3, 4, 5, 6, or even at least 7 polymeric layers, each exhibiting a random network of strands and connective regions. In some embodiments, all the layers, or some of the layers are adjacent another layer exhibiting a random network of strands and connective regions. In some embodiments, at least one of the first or second (in some embodiments each of the first and second) major surfaces of a polymeric multilayer film exhibits a random network of strands and connective regions.

Figure 1:
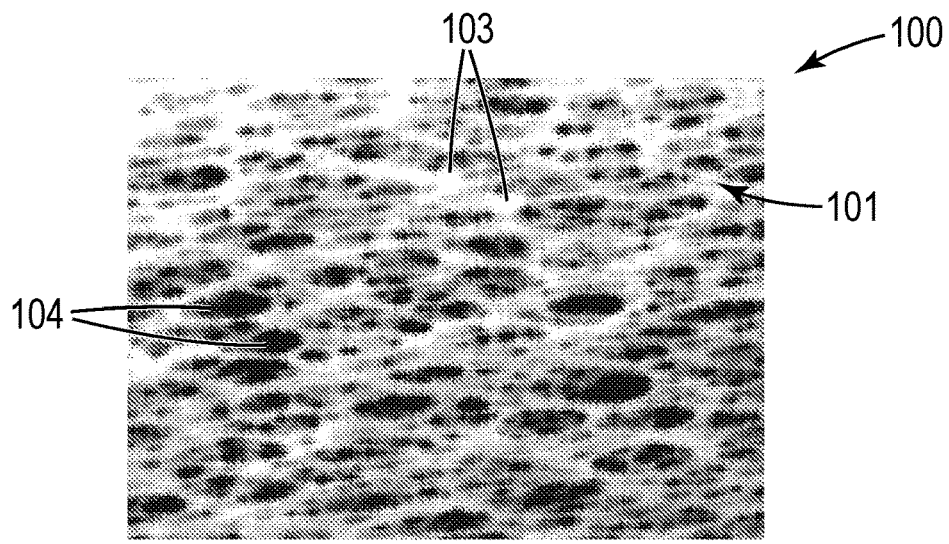
FIG. 1 is a top view schematic of an exemplary polymeric multilayer film described herein.
Figure 1A:
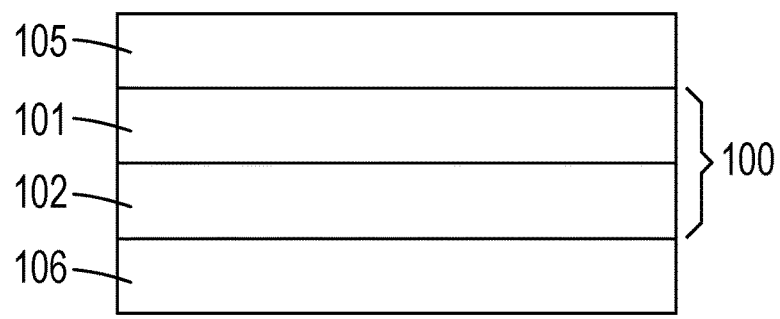
FIG. 1A is a side view of the exemplary polymeric multilayer film shown in FIG. 1.

Referring to FIGS. 1 and 1A, exemplary polymeric multilayer film 100 has first and second adjacent layers 101, 102, respectively, each exhibiting random network of strands 103 and connective regions 104. As shown, first and second adjacent layers 101, 102 as disposed between (optional) continuous layers 105 and 106, respectively. In order to see layer 101, continuous layer 105 is not shown in FIG. 1.

Figure 2:
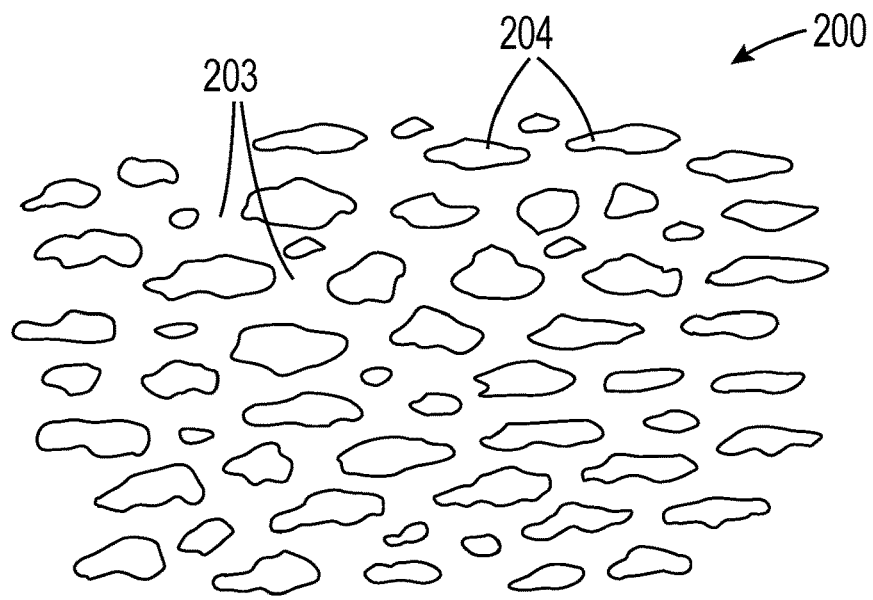
FIG. 2 is a top view schematic of another exemplary random network of strands and connective regions.

Referring to FIG. 2, another example of random network of strands 203 and connective regions 204 is shown.

In some embodiments, a layer exhibiting a random network of strands and connective regions independently comprises at least one of a polyolefinic material (e.g., polypropylene and/or polyethylene), modified polyolefinic material, polyvinyl chloride, polycarbonate, polystyrene, polyester (including co-polyester), polylactide, polyvinylidene fluoride, (meth)acrylic (e.g., polymethyl methacrylate), urethane, acrylic urethane, ethylene vinyl acetate copolymer, acrylate-modified ethylene vinyl acetate polymer, ethylene acrylic acid copolymers, nylon, engineering polymer (e.g., a polyketone and/or polymethylpentane), or elastomer (e.g., natural rubber; synthetic rubber; styrene block copolymer containing isoprene, butadiene, or ethylene (butylene) blocks; metallocene-catalyzed polyolefin, polyurethanes; or polydiorganosiloxane).

In some embodiments, a layer exhibiting a random network of strands and connective regions has an open porosity of at least 1 (in some embodiments, at least 5, 10, 15, 20, 25, 30, 35, 40, 45, 50, 55, 60, 65, 70, 75, or even at least 80; in some embodiments, in a range from 1 to 80) percent.

In general, polymeric multilayer film comprising at least two adjacent layers, each exhibiting a random network of strands and connective regions described herein, can be made by overfoaming a layer in a blown film process that uses an annular die to form a molten tube of film oriented radially via air pressure in a "bubble," and also pulled lengthwise in the molten area to thin the film to the final desired thickness. For example, referring to FIG. 3, apparatus for making polymeric multilayer film comprising at least two adjacent layers, each exhibiting a random network of strands and connective regions described herein 300 includes hopper 304, extruder 306, annular die 308, air ring 310, collapsing frame 314, rollers 316A, 316B that form nip 317, slitting station 323 and idler rolls 318, 319. Referring to FIG. 3A, further details of nine-layer annular die 308 are shown, including stacked die plates, with each individual die plate stack layer having machined polymer flow channels 309A, 309B, 309C, 309D, 309E, 309F, 309G, 309H, 309I. During the film making process the molten polymer passes through the flow channels 309A, 309B, 309C, 309D, 309E, 309F, 309G, 309H, 309I and contacts central die cylinder 310 and then flows upward combining with other layers and exits annular die opening 311 to form multilayered film tube 312. The number of layers in the polymeric multilayer film can be adjusted by the number of stacking die plates in the annular die.

In operation, resin 302 (typically in the form of pellets) and other additives are added to hopper 304. Molten or otherwise flowable resin exits extruder 306 into annular die 308. Air ring 310 provides uniform air flow over the molten polymer bubble which stabilizes and aids in cooling of the polymer bubble forming circular film bubble 312 into a collapsed film tube 320 by passing through nip 317 formed by contacting nip rolls 316A and 316B. The collapsed film tube traverses idler rolls 318 and passes through slitting station 323 resulting in the formation of two flat films 320A and 320B that are passed over additional idler roll 319. Films 320A and 320B are then wound into individual rolls 321A and 321B, respectively. A layer(s) of the polymeric multilayer film can be foamed or overfoamed, for example, by introducing a gas into the molten polymer inside the extruder. The gas is readily absorbed into the polymer under the heat and pressure of the extrusion process. When the molten polymer exits the extrusion die, the absorbed, pressurized gas rapidly expands and forms voids. The proper process conditions can be adjusted so that when the polymer solidifies, the void structure is "locked in" resulting in a foam structure in the polymeric film.

Foaming of a layer(s) can be facilitated, for example, by including or injecting a foaming agent in the resin for that layer(s). Foaming agents are known in the art and include injecting gases, (e.g., nitrogen or carbon dioxide) into the molten polymer. Foaming agents are known in the art, and include a blend of alkaline earth metal carbonates and alkaline metal acid salts that are described in U.S. Pat. No. 8,563,621 (Lapierre), the disclosure of which is incorporated herein by reference. Exemplary commercially available blowing agents include those under the trade designation "ECOCELL H" from Polyfil Corp., Rockaway, N.J. Other exemplary chemical blowing agents for polymers are well known in the art and include hydrazine, hydrazide, and azodicarbonamide materials (e.g., 4,4'-oxybis (benzenesulfonyl hydrazide) (OBSH) (available, for example, in a masterbatch form under the trade designation "CELOGEN OT" from ChemPoint, Bellevue, Wash.). Another exemplary chemical blowing agent is an endothermic foaming agent, available as a masterbatch under the trade designation "FCX111263" from RTP Company, Winona, Minn.

In some embodiments, the forming agent is added to the resins that is fed into the extruder. The foaming agent and other processing conditions are selected or adjusted to provide a desired or acceptable polymeric multilayer film comprising a layer(s) exhibiting a random network of strands and connective region.

In some embodiments, at least one layer of a polymeric multilayer film described herein comprises an ultraviolet (UV) absorber. A UV absorbing layer (e.g., a UV protective layer) can aid in protecting other layers or substrates from UV-light caused damage/degradation over time by absorbing UV-light (in some embodiments, any UV-light).

In some embodiments, the UV absorbers are red shifted UV absorbers (RUVA) that absorb at least 70% (in some embodiments, at least 80%, or even at least 90%) of the UV light in the wavelength region from 180 nm to 400 nm. Typically, it is desirable that the RUVA be highly soluble in polymers, highly absorptive, photo-permanent, and thermally stable in at least the temperature range from 200° C. to 300° C. for extrusion process to form the protective layer. In some embodiments, a RUVA is copolymerizable with monomers to form a protective coating layer by at least one of free radical initiator curing, UV curing, gamma ray curing, e-beam curing, or thermal curing processes. Exemplary UVAs are UVA oligomers as described, for example, in PCT Pub. Nos. WO 2014/10055A1 (Olson et. al.), WO 2014/100580A1 (Olson et. al.), WO 2015/200655 (Olson et. al.), WO 2015/200669 (Olson et. al.), and WO 2015/200657 (Olson et. al.), the disclosure of which are incorporated herein by reference.

RUVAs typically have enhanced spectral coverage in the long-wave UV region (i.e., 300 nm to 400 nm), enabling them to block the high wavelength UV light that can cause yellowing in most polymers. Typical UV protective layers have thicknesses in a range from about 13 micrometers to 380 micrometers with a RUVA loading level in a range from about 2-10% by weight. Exemplary RUVAs include benzotriazole compound, 5-trifluoromethyl-2-(2-hydroxy-3-alpha-cumyl-5-tert-octylphenyl)-2H-benzotriazole (available under the trade designation "CGL-0139" from BASF Corporation, Florham, N.J.), benzotriazoles (e.g., 2-(2-hydroxy-3,5-di-alpha-cumylphehyl)-2H-benzotriazole, 5-chloro-2-(2-hydroxy-3-tert-butyl-5-methylphenyl)-2H-benzotriazole, 5-chloro-2-(2-hydroxy-3,5-di-tert-butylphenyl)-2H-benzotriazole, 2-(2-hydroxy-3,5-di-tert-amylphenyl)-2H-benzotriazole, 2-(2-hydroxy-3-alpha-cumyl-5-tert-octylphenyl)-2H-benzotriazole, 2-(3-tert-butyl-2-hydroxy-5-methylphenyl)-5-chloro-2H-benzotriazole), and 2(-4,6-diphenyl-1-3,5-triazin-2-yl)-5-hexyloxy-phenol. Additional commercially available RUVAs include those available from BASF Corporation under the trade designations "TINUVIN 1577," "TINUVIN 1600," and "TINUVIN 777." Other exemplary UV absorbers are available, for example, in a polymethylmethacrylate (PMMA) UVA masterbatch from Sukano Polymers Corporation, Duncan, S.C., under the trade designations "TA11-10 MB03."

In some embodiments, at least one layer of a polymeric multilayer film described herein comprises a hindered amine light stabilizer (HALS). Exemplary HALS include those available from BASF Corporation under the trade designations "CHIMASSORB 944" and "TINUVIN 123." Another exemplary HALS is available, for example, from BASF Corp., under the trade designation "TINUVIN 944."

In some embodiments, at least one layer of a polymeric multilayer film described herein comprises an antioxidant. Exemplary antioxidants include those available under the trade designations "IRGANOX 1010" and "ULTRANOX 626" from BASF Corporation.

In some embodiments, at least one layer of a polymeric multilayer film described herein comprises an antioxidant. Antioxidants can reduce or prevent degradation of the color development, and the physical and mechanical properties of the polymeric multilayer film. Exemplary antioxidant materials include those commercially available, for example, under the trade designations "CYANOX 1790" and "CYANOX 2777" from Cytec Solvay Group, Woodland Park, N.J.

In some embodiments, at least one layer of a polymeric multilayer film described herein comprises a hydrophilic material. Hydrophilic additives can increase absorption of aqueous liquids. This may be useful, for example, for cleaning products to absorb spills and aqueous cleaning agents, and medical applications to absorb body fluids. Exemplary hydrophilic materials include an anionic surfactant, available, for example, under the trade designation "JDOSS 50P" from JLK Industries, Coopersburg, Pa., or a non-ionic surfactant (PEG-5 Cocamide), available, for example, under the trade designation "HETOXAMIDE C4" from Global 7 Industries, Franklin, N.J.

In some embodiments, at least one layer of a polymeric multilayer film described herein comprises at least one antistatic material. Antistatic materials can, for example, reduce dust and dirt attraction to finished products, reduce sparks through discharges, reduce ignition of flammable liquid and gas, reduce damage to electronic microcircuits, and reduce jamming of transport equipment. Exemplary antistatic materials include those available under the trade designations "CTASTAT 609" and "CYASTAT SN" from Cytec Solvay Group, Woodland Park, N.J.

In some embodiments, at least one layer of a polymeric multilayer film described herein comprises a release agent. Exemplary release agents include at least one of an alkyl dimethicone, a polyvinyl octadecyl carbamate, or an ethylene bis-stearamide. Alkyl dimethicones, are described, for example, in U.S. Pat. No. 9,187,678 (Boardman et al.). A polyvinyl octadecyl carbamate is commercially available, for example, under the trade designation "ESCOAT P-77" (a polyvinyl octadecyl carbamate in a linear, low density carrier resin) from Mayzo, Inc., Suwanee, Ga. An ethylene bis-stearamide is available, for example, under the trade designation "AMPACET 100666" from Ampacet Corporation, Tarrytown, N.Y. Pressure sensitive adhesive tapes, or adhesive tapes, are often provided in roll form, wherein the tape construction includes a backing, an adhesive layer on one major side of the backing, and a release layer on the other major side of the backing. The release layer allows the tape to be unwound from the roll at a controlled level. Other articles having release characteristics are employed in a variety of applications. Any adhesive coated article, including tapes, die-cut adhesive articles, and labels, require, as a matter of practicality, a release coating or a separate release liner. The release coating or liner provides a surface to which the article does not permanently adhere.

In some embodiments, at least one layer of a polymeric multilayer film described herein comprises at least one of a slip additive or blocking agent. Slip additives can modify the surface properties of a film, lowering the friction between film layers and other surfaces. To be effective, the slip needs to migrate out of the polymer to the surface and therefore, it needs have a degree of incompatibility with the polymer.

Exemplary slip additives include fatty acid amides such as erucamide or oleamide. During processing, slip additives solubilize in the amorphous melt, but as the polymer cools and crystalizes, the fatty acid amide is "squeezed" out, forming a lubricating layer at the polymer surface. The addition of a slip additive can reduce or prevent film sticking and pulling, helping to increase throughput. Exemplary slip additives are commercially available, for example, under the trade designations "AMPACET 100497" (a masterbatch containing 1% erucamide, in low density polyethylene carrier resin); and "#10358" (a masterbatch of 5% oleamide, in a polyethylene carrier) from Ampacet Corporation, Tarrytown, N.Y.

A blocking agent can reduce or prevent blocking of layers. Polyolefin and other plastic films have a tendency to adhere together, often making it difficult to separate layers. This adhesion between film layers, called blocking, is an inherent property of some polymers. Antiblocking additives can be added to the film to minimize this adhesion and lower the blocking force between layers. Once compounded into a plastic, these additives create a microrough surface, which reduces the adhesion between film layers and lowers the blocking tendency. Exemplary antiblock agents are typically inorganic materials such as diatomaceous earth, talc, calcium carbonate, clay, mica and ceramic spheres. An exemplary antiblock agent is commercially available, for example, under the trade designations "ABC5000" from Polyfil Corporation, Rockaway, N.J.; and "AMPACET 102077" from Ampacet Corp.

In some embodiments, at least one layer of a polymeric multilayer film described herein comprises an abrasion resistant material. Abrasion resistant materials may be added to reduce scratching, marring and abrasion of the finished product. An exemplary abrasion resistant additive is commercially available, for example, under the trade designation "MB25-381" (a masterbatch containing a siloxane polymer) from Dow Corning, Auburn Mich.

In some embodiments, at least one layer of a polymeric multilayer film described herein comprises at least one of a dye or pigment (e.g., imparting a color such as white, yellow, green, blue, red, orange, brown, black, etc.). Exemplary dyes include those commercially available, for example, under the trade designation "CLARIANT REMAFIN PE63421213-ZN" (a green dye masterbatch) from Clariant International AG, Muttenz, Switzerland. Exemplary pigments include titanium dioxide, zinc oxide, and zirconium dioxide. An exemplary pigment, commercially available masterbatch of titanium dioxide pigment in a polyolefin carrier, under the trade designation "#11937" from Standridge Color Corporation, Social Circle, Ga.

In some embodiments, at least one layer of a polymeric multilayer film described herein comprises at least one of an ink or paint receptive material. Ink receptive materials can be desirable for adding an informational or decorative element to a film to improve the functionality or aesthetics of the film. Exemplary receptive materials include, for example, ethylene/vinyl acetate/carbon monoxide terpolymer, as described, for example, in U.S. Pat. No. 6,316,120 (Emslander), the disclosure of which is incorporated herein by reference.

In some embodiments, at least one layer of a polymeric multilayer film described herein comprises metallic (e.g., aluminum, bronze, stainless steel, zinc, iron, tin, silver, gold, and/or titanium) particles. Metallic particles can provide unique decorative aspects, such as sparkle or pearlescence to films. An exemplary metallic particle additive is commercially available, for example, under the trade designation "PELLEX A240-50" (a metallic glitter masterbatch) from The Cary Company, Addison, Ill.

In some embodiments, at least one layer exhibiting a random network of strands and connective regions is separable from the remaining polymeric multilayer film.

In some embodiments, at least one layer of a polymeric film described herein, including a layer exhibiting a random network of strands and connective regions, comprises an adhesive (including pressure sensitive adhesives).

In some embodiments, at least one layer of a polymeric film described herein, including a layer exhibiting a random network of strands and connective regions, is essentially free of pressure sensitive adhesive. In some embodiments, the layer exhibiting a random network of strands and connective regions comprises a pressure sensitive adhesive. Exemplary pressure sensitive adhesives include those available, for example, under the trade designations "OCA8171" and "OCA8172" from 3M Company, St. Paul, Minn. Extrudable pressure sensitive adhesives are commercially available, for example, under the trade designations "LIR-290," "LA2330," "LA2250," "LA2140E," and "LA1114" from Kuraray, Osaka, Japan; and "ESCORE" from Exxon Mobil, Irving, Tex. The tackiness of pressure sensitive adhesives can be adjusted, for example, with tackifiers.

Other exemplary adhesives include isobutylene/isoprene copolymers available, for example, under the trade designations "EXXON BUTYL 065," "EXXON BUTYL 068," and "EXXON BUTYL 268" (believed to have unsaturation in the range of about 1.05 to about 2.30 mole percent) from Exxon Mobil Corp.; "BK-1675N" (believed to have unsaturation of about 1.7 mole percent) from United Chemical Products, Velizy-Villacoublay, France; "LANXESS BUTYL 301" (believed to have an unsaturation of about 1.85 mole percent), "LANXESS BUTYL 101-3" (believed to have unsaturation of about 1.75 mole percent), and "LANXESS BUTYL 402" (believed to have unsaturation of about 2.25 mole percent) from Lanxess, Sarnia, Ontario, Canada; and "SIBSTAR" (available as both diblocks and triblocks with the styrene content believed to vary from about 15 to about 30 mole percent, based on the mole percent of the copolymer) from Kaneka, Osaka, Japan. Exemplary polyisobutylene resins are commercially available, for example, from under the trade designations "VISTANEX" from Exxon Chemical Co., Irving, Tex.; "HYCAR" from Goodrich Corp., Charlotte, N.C.; and "JSR BUTYL" from Japan Butyl Co., Ltd., Kanto, Japan.

In general, suitable polyisobutylenes may have a wide variety of molecular weights and a wide variety of viscosities. In some embodiments, the polyisobutylene has a weight average molecular weight (as measured by Gel Permeation Chromatography using polystyrene standards) of at least about 300,000 (in some embodiments, at least about 400,000, or even at least 500,000 or more) grams per mole. In some embodiments, the polyisobutylene has a weight average molecular weight of less than 300,000 (in some embodiments, up to 280,000, 275,000, 270,000, 260,000, 250,000, 240,000, 230,000, 220,000, 210,000, or up to 200,000) grams per mole. In some embodiments, when defined by the viscosity as measured by intrinsic viscosity at 20° C. in diisobutylene, the polyisobutylene has a viscosity average molecular weight in a range from 100,000 to 10,000,000 (in some embodiments, 500,000 to 5,000,000) grams per mole. Polyisobutylenes of many different molecular weights and viscosities are commercially available. In some embodiments, the molecular weight of the polyisobutylene changes during the process of making a pressure sensitive adhesive.

In some embodiments, pressure sensitive adhesives that comprise polyisobutylene further comprises a hydrogenated hydrocarbon tackifier (in some embodiments, a poly(cyclic olefin)). In some embodiments, the hydrogenated hydrocarbon tackifier is present in a range from about 5 to about 90 percent by weight, based on the total weight of the pressure sensitive adhesive composition. In some embodiments, poly(cyclic olefin) is blended with about 10 to about 95 percent by weight polyisobutylene, based on the total weight of the pressure sensitive adhesive composition. In some embodiments, the pressure sensitive adhesive comprises hydrogenated hydrocarbon (e.g., poly(cyclic olefin)) tackifier in a range from about 5 to about 70 weight percent, based on the total weight of the pressure sensitive adhesive composition and about 30 to about 95 weight percent polyisobutylene, based on the total weight of the pressure sensitive adhesive composition. In some embodiments, a hydrogenated hydrocarbon tackifier (in some embodiments, the poly(cyclic olefin)) is present in an amount of less than 20 (in some embodiments, less than 15) percent by weight, based on the total weight of the pressure sensitive adhesive composition. For example, the hydrogenated hydrocarbon tackifier (in some embodiments, the poly(cyclic olefin)) may be present in a range from 5 to 19.95, 5 to 19, 5 to 17, 5 to 15, 5 to 13, or even 5 to 10 percent by weight, based on the total weight of the pressure sensitive adhesive composition. In some embodiments, the pressure sensitive adhesive is free of acrylic monomers and polyacrylates. Exemplary polyisobutylene pressure sensitive adhesives include adhesive compositions comprising a hydrogenated poly(cyclic olefin) and a polyisobutylene resin such as those reported in PCT Pub. No. WO 2007/087281 (Fujita et al.), the disclosure of which is incorporated herein by reference.

Exemplary hydrogenated hydrocarbon tackifiers for the optional fourth layer are commercially available, for example, from Arakawa Chemical Industries Co., Ltd., Osaka, Japan, under the trade designations "ARKON P" and "ARKON M." These materials are described in the trade literature as being water white, hydrogenated hydrocarbon resins. Hydrogenated hydrocarbon tackifiers under the trade designation "ARKON P" (e.g., P-70, P-90, P-100, P-115, and P-140) are said to be fully hydrogenated while those under the trade designation "ARKON M" (e.g., M-90, M-100, M-115, and M-135) are partially hydrogenated. The hydrogenated hydrocarbon tackifier available under the trade designation "ARKON P-100" is said to have a number average molecular weight of about 850 grams/mole, a softening point of about 100° C., and a glass transition temperature of about 45° C. The hydrogenated hydrocarbon tackifier available under the trade designation "ARKON P-140" has a number average molecular weight of about 1250 grams/mole, a softening point of about 140° C., and a glass transition temperature of about 90° C. The hydrogenated hydrocarbon tackifier available under the trade designation "ARKON M-90" has a number average molecular weight of about 730 grams/mole, a softening point of about 90° C., and a glass transition temperature of about 36° C. The hydrogenated hydrocarbon tackifier available under the trade designation "ARKON-M-100" has a number average molecular weight of about 810 grams/mole, a softening point of about 100° C., and a glass transition temperature of about 45° C.

Other exemplary hydrogenated hydrocarbon tackifiers for the optional fourth layer are available, for example, from Exxon Chemical under the trade designations "ESCOREZ 1315," "ESCOREZ 1310LC," "ESCOREZ 1304," "ESCOREZ 5300," "ESCOREZ 5320," "ESCOREZ 5340," "ESCOREZ 5380," "ESCOREZ 5400," "ESCOREZ 5415," "ESCOREZ 5600," "ESCOREZ 5615," "ESCOREZ 5637," and "ESCOREZ 5690."

The "1300" series resins are described in the trade literature as being aliphatic resins with a high softening point. The "ESCOREZ 1315" resin is said to have a weight average molecular weight of about 2200 grams/mole, a softening point in the range of about 112° C. to about 118° C., and a glass transition temperature of about 60° C. The "ESCOREZ 1310LC" resin is said to have a light color, a weight average molecular weight of about 1350 grams/mole, a softening point of about 95° C., and a glass transition temperature of about 45° C. The "ESCOREZ 1304" resin is said to have a weight average molecular weight of about 1650 grams/mole, a softening point in the range of about 97° C. to about 103° C., and a glass transition temperature of about 50° C.

The "5300" series of resins are described in the trade literature as being water white, cycloaliphatic hydrocarbon resins, and have a weight average molecular weight in the range of about 370 grams/mole to about 460 grams/mole, a softening point in the range of about 85° C. to about 140° C., and a glass transition temperature in the range of about 35° C. to about 85° C.

The "5400" series of resins are described in the trade literature as being very light colored cycloaliphatic hydrocarbon resins, and have a weight average molecular weight in the range of about 400 grams/mole to about 430 grams/mole, a softening point in the range of about 103° C. to about 118° C., and a glass transition temperature in the range of about 50° C. to about 65° C.

The "5600" series of resins are described in the trade literature as being very light colored, aromatic modified cycloaliphatic resin where the percent of aromatic hydrogen atoms is in the range of about 6 to about 12 weight percent based on the weight of all the hydrogen atoms in the resins. Further, the "5600" series of resins are said to have a weight average molecular weight in the range of about 480 grams/mole to about 520 grams/mole, a softening point in the range of about 87° C. to about 133° C., and a glass transition temperature in the range of about 40° C. to about 78° C.

Other exemplary suitable hydrogenated hydrocarbon tackifiers for the optional fourth layer are available, for example, from Eastman, Kingsport, Tenn., under the trade designations "REGALREZ 1085," "REGALREZ 1094," "REGALREZ 1126," "REGALREZ 1139," "REGALREZ 3102," and "REGALREZ 6108." These resins are described in the trade literature as hydrogenated aromatic pure monomer hydrocarbon resins. They have a weight average molecular weight ranging from about 850 grams/mole to about 3100 grams/mole, a softening temperature in the range of about 87° C. to about 141° C., and a glass transition temperature in the range of about 34° C. to about 84° C. The "REGALEZ 1018" resin can be used in applications that do not generate heat. This tackifying resin has a weight average molecular weight of about 350 grams/mole, a softening point of about 19° C., and a glass transition temperature of about 22° C.

Other exemplary hydrogenated hydrocarbon tackifiers are available, for example, from Cray Valley, Exton, Pa., under the trade designations "WINGTACK 95" and "WINGTACK RWT-7850." The trade literature describes these tackifying resins as synthetic resins obtained by cationic polymerization of aliphatic $C_5$ monomers. The tackifying resin available under the trade designation "WINGTACK 95" is a light yellow solid with a weight average molecular weight of about 1700 grams/mole, a softening point of about 98° C., and a glass transition temperature of about 55° C. The tackifying resin available under the trade designation "WINGTACK RWT-7850" is a light yellow solid with a weight average molecular weight of about 1700 grams/mole, a softening point of about 102° C., and a glass transition temperature of 52° C.

Other exemplary hydrogenated hydrocarbon tackifiers are available, for example, from Eastman under the trade designations "PICCOTAC 6095-E," "PICCOTAC 8090-E," "PICCOTAC 8095," "PICCOTAC 8595," "PICCOTAC 9095," and "PICCOTAC 9105." The trade literature describes these resins as aromatic modified, aliphatic hydrocarbon resin or as aromatic modified $C_5$ resins. The tackifier available under the trade designation "PICCOTACK 6095-E" has a weight average molecular weight of about 1700 grams/mole and a softening point of about 98° C. The tackifier available under the trade designation "PICCOTACK 8090-E" has a weight average molecular weight of about 1900 grams/mole and a softening point of about 92° C. The tackifier available under the trade designation "PICCOTACK 8095" has a weight average molecular weight of about 2200 grams/mole and a softening point of about 95° C. The tackifier available under the trade designation "PICCOTAC 8595" has a weight average molecular weight of about 1700 grams/mole and a softening point of about 95° C. The tackifier available under the trade designation "PICCOTAC 9095" has a weight average molecular weight of about 1900 grams/mole and a softening point of about 94° C. The tackifier available under the trade designation "PICCOTAC 9105" has a weight average molecular weight of about 3200 grams/mole and a softening point of about 105° C.

In some embodiments, the hydrogenated hydrocarbon tackifier is a hydrogenated poly(cyclic olefin) polymer. Poly(cyclic olefin) polymers generally have low moisture permeability and can impact the adhesive properties of the polyisobutylene resin, for example, by functioning as a tackifier. Exemplary hydrogenated poly(cyclic olefin) polymers include hydrogenated petroleum resins; hydrogenated terpene-based resins (e.g., available from Yasuhara Chemical, Hiroshima, Japan, under the trade designation "CLEARON," in grades P, M, and K); hydrogenated resin or hydrogenated ester-based resins (available, for example, from Hercules Inc., Wilmington, Del., under the trade designations "FORAL AX" and "FORAL 105" and from Arakawa Chemical Industries Co., Ltd., Osaka, Japan, under the trade designations "PENCEL A," "ESTERGUM H," and "SUPER ESTER A"); disproportionate resins or disproportionate ester-based resins (available, for example, from Arakawa Chemical Industries Co., Ltd. under the trade designation "PINECRYSTAL"); a hydrogenated dicyclopentadiene-based resin (e.g., a hydrogenated $C_5$-type petroleum resin obtained by copolymerizing a $C_5$ fraction such as pentene, isoprene, or piperine with 1,3-pentadiene produced through thermal decomposition of petroleum naphtha (available, for example, from Exxon Chemical Co. under the trade designations "ESCOREZ 5300" and "ESCOREZ 5400" and from Eastman Chemical Co. under the trade designation "EASTOTAC H")); a partially hydrogenated aromatic modified dicyclopentadiene-based resin (available, for example, from Exxon Chemical Co. under the trade designation "ESCOREZ 5600"); a resin resulting from hydrogenation of a $C_9$-type petroleum resin obtained by copolymerizing a $C_9$ fraction such as indene, vinyltoluene and α- or β-methylstyrene produced by thermal decomposition of petroleum naphtha (available, for example, from Arakawa Chemical Industries Co., Ltd. under the trade designations "ARCON P" or "ARCON M"); and a resin resulting from hydrogenation of a copolymerized petroleum resin of the above-described $C_5$ fraction and $C_9$ fraction available, for example, from Idemitsu Petrochemical Co., Tokyo, Japan, under the trade designation "IMARV"). In some embodiments, the hydrogenated poly(cyclic olefin) is a hydrogenated poly (dicyclopentadiene), which may provide advantages to the PSA (e.g., low moisture permeability and transparency).

The hydrogenated hydrocarbon tackifier generally has a solubility parameter (SP value), which is an index for characterizing the polarity of a compound, that is similar to that of the polyisobutylene and exhibits good compatibility (i.e., miscibility) with the polyisobutylene so that a transparent film can be formed. The tackifying resins are typically amorphous and have a weight average molecular weight no greater than 5000 grams/mole. If the weight average molecular weight is greater than about 5000 grams/mole, compatibility with the polyisobutylene material may decrease, tackiness may decrease, or both. The molecular weight is often no greater than 4000 (in some embodiments no greater than 2500, 2000, 1500, 1000, or even no greater than 500; in some embodiments, the molecular weight is in the range of 200 to 5000, 200 to 4000, 200 to 2000 or even 200 to 1000) grams/mole.

In some embodiments, polymeric multilayer films described herein further comprise at least one continuous (i.e., does not containing openings extending from one major surface to another major surface) layer. In some embodiments, a continuous layer adjacent to a layer exhibiting a random network of strands and connective regions becomes textured from the random network of strands and connective regions (e.g., the continuous layer may conform at least in part to the texture of the random network of strands and connective regions). Exemplary continuous layers comprise at least one of a polyolefinic material (e.g., polypropylene and/or polyethylene), modified polyolefinic material, polyvinyl chloride, polycarbonate, polystyrene, polyester (including co-polyester), polylactide, polyvinylidene fluoride, (meth)acrylic (e.g., polymethyl methacrylate), urethane, acrylic urethane, ethylene vinyl acetate copolymer, acrylate-modified ethylene vinyl acetate polymer, ethylene acrylic acid copolymers, nylon, engineering polymer (e.g., a polyketone and/or polymethylpentane), or elastomer (e.g., natural rubber; synthetic rubber; styrene block copolymer containing isoprene, butadiene, or ethylene (butylene) blocks; metallocene-catalyzed polyolefin, polyurethanes; or polydiorganosiloxane).

Continuous layers can be provided by techniques known in the art, such as hot melt extrusion of an extrudable composition comprising the components of the continuous layer composition. Exemplary methods for making extrudable continuous layers are described, for example, in Progelhof, R. C., and Throne, J. L., "Polymer Engineering Principles," Hanser/Gardner Publications, Inc., Cincinnati, Ohio, 1993, the disclosure of which is incorporated herein by reference.

Alternatively, for example, at least one layer may be extruded as a separate sheet and laminated together. In some embodiments, the substrate can advantageously combine the best properties of several resins in the various layers while minimizing the use of the most expensive resins, leading to a higher value and lower cost image receptor medium. For example, the substrate layer may be made with resins of generality low cost that can be chosen to provide specifically desired physical properties to the multilayered film. These properties may include dimensional stability, tear resistance, conformability, elastomeric properties, die cuttability, stiffness, and heat resistance.

In some embodiments, a continuous layer is a skin layer. In some embodiments, at least one layer exhibiting a random network of strands and connective regions is disposed between two continuous layers. In some embodiments, a continuous layer is disposed between two layers exhibiting a random network of strands and connective regions.

In some embodiments, a first continuous layer is free of a pressure sensitive adhesive, and the layer exhibiting a random network of strands and connective regions comprises a pressure sensitive adhesive. In some embodiments, a first continuous layer comprises a first pressure sensitive adhesive, and the layer exhibiting a random network of strands and connective regions comprises a second pressure sensitive adhesive.

In some embodiments comprising more than one layer exhibiting a random network of strands and connective regions, at least two such layers exhibit different random network of strands and connective regions.

In some embodiments comprising more than one layer exhibiting a random network of strands and connective regions, one layer exhibiting a random network of strands and connective regions is free of a pressure sensitive adhesive, and another layer exhibiting a random network of strands and connective regions comprises a pressure sensitive adhesive.

In some embodiments comprising more than one layer exhibiting a random network of strands and connective regions, one layer exhibiting a random network of strands and connective regions comprises a first pressure sensitive adhesive, and another layer exhibiting a random network of strands and connective regions comprises a second, different pressure sensitive adhesive.

In some embodiments, a polymeric multilayer film described herein further comprises a second continuous layer, wherein the first layer exhibiting a random network of strands and connective regions is disposed between the first and second continuous layers.

In some embodiments, polymeric multilayer films described herein have a thickness in a range from 1 micrometer to 1000 micrometers (in some embodiments, in a range from 25 micrometers to 500 micrometers, 50 micrometers to 250 micrometers, or even 2 micrometers to 10 micrometers).

In some embodiments, polymeric multilayer films described herein have a machine and cross-machine direction, wherein the polymeric multilayer film is elastic in the cross-machine direction.

In some embodiments, polymeric multilayer films described herein further comprise at least one liner. For example, a liner having a major surface attached to either the first or second major surface of the polymeric multilayer film. In some embodiments, each major surface of the polymeric multilayer film has a liner attached thereto. In some embodiments, the liner comprises a polymeric multilayer film exhibiting a random network of strands and connective regions. In some embodiments, the liner has a major surface exhibiting a random network of strands and connective regions. In some embodiments, the polymeric multilayer film has an adhesive (e.g., a pressure sensitive adhesive) layer on the major surface of the liner. For liners having a major surface exhibiting a random network of strands and connective regions, the major surface of the adhesive on the major surface of the liner has the inverse surface of the major surface of the liner. In some embodiments, the first or second major surface of the polymeric multilayer film attached to the major surface of the liner is an adhesive (e.g., a pressure sensitive adhesive) surface. For liners having a major surface exhibiting a random network of strands and connective regions, the major surface of the polymeric multilayer film attached to the liner has the inverse surface of the major surface of the liner.

Embodiments of polymeric multilayer films described herein are useful, for example, for tape and graphic articles (e.g., a graphic film). A "graphic film" is a film that absorbs at least some light having wavelengths in the visible or near infrared range and reflects at least some light in the visible range where the reflected light contains some graphical content. The graphical content may include patterns, images or other visual indicia. The graphic film may be a printed film or the graphic may be created by means other than printing. For example, the graphic film may be perforated reflective film with a patterned arrangement of perforations. The graphic may also be created by embossing. In some embodiments, the graphic film is a partially transmissive graphic film (e.g., in use in a backlighted sign (e.g., a backlighted traffic sign)). Advertising and promotional displays often include graphic images appearing on structural surfaces such as truck sides and awnings, or free-hanging as banners. To prepare the display, an image may be formed on an adhesive-backed image receptor medium, sometimes referred to as a graphic marking film, which is then adhered to the desired substrate. Although the graphic display may be intended for a long-term installation of 5 years or more, it is often a relatively short term (3 months to 1 year) outdoor installation. In the case of a short-term display, the image receptor medium is desirably a low cost, weather resistant, durable graphic marking film having good printability and adhesion of inks and/or toners that is easily applied to and removed from a surface.

Exemplary Embodiments

1. A polymeric multilayer film comprising at least two adjacent polymeric layers each exhibiting a random network of strands (in some embodiments, elongated strands) and connective regions (the random network has a first optical density and the connective regions has a second optical density, wherein the first optical density is greater than the second optical density; in some embodiments, there are openings in at least some of the connective regions, whereas in some embodiments there are no openings (i.e., no through holes) in the layer). In some embodiments, at least 3, 4, 5, 6, or even at least 7 polymeric layers, each exhibiting a random network of strands and connective regions. In some embodiments, one or more additional polymeric layers exhibiting a random network of strands and connective regions comprise a pressure sensitive adhesive, each of which may be the same or different from the first pressure sensitive adhesive or from each other.

2. The polymeric multilayer film of Exemplary Embodiment 1, wherein the layers exhibiting a random network of strands and connective regions independently comprise at least one of a polyolefinic material (e.g., polypropylene and/or polyethylene), modified polyolefinic material, polyvinyl chloride, polycarbonate, polystyrene, polyester (including co-polyester), polylactide, polyvinylidene fluoride, (meth)acrylic (e.g., polymethyl methacrylate), urethane, acrylic urethane, ethylene vinyl acetate copolymer, acrylate-modified ethylene vinyl acetate polymer, ethylene acrylic acid copolymers, nylon, engineering polymer (e.g., a polyketone and/or polymethylpentane), or elastomer (e.g., natural rubber; synthetic rubber; styrene block copolymer containing isoprene, butadiene, or ethylene (butylene) blocks; metallocene-catalyzed polyolefin, polyurethanes; or polydiorganosiloxane).

3. The polymeric multilayer film of any preceding Exemplary Embodiment, wherein at least one layer exhibiting a random network of strands and connective regions has an open porosity of at least 1 (in some embodiments, at least 5, 10, 15, 20, 25, 30, 35, 40, 45, 50, 55, 60, 65, 70, 75, or even at least 80; in some embodiments, in a range from 1 to 80) percent.

4. The polymeric multilayer film of any preceding Exemplary Embodiment, wherein at least one layer exhibiting a random network of strands and connective regions is separable from the remaining polymeric multilayer film.

5. The polymeric multilayer film of Exemplary Embodiment 4, wherein the layer exhibiting a random network of strands and connective regions is essentially free of pressure sensitive adhesive.

6. The polymeric multilayer film of Exemplary Embodiment 4, wherein the layer exhibiting a random network of strands and connective regions comprises a pressure sensitive adhesive.

7. The polymeric multilayer film of any preceding Exemplary Embodiment further comprising a first continuous layer.

8. The polymeric multilayer film of Exemplary Embodiment 7, wherein the first continuous layer is free of a pressure sensitive adhesive, and wherein the layer exhibiting a random network of strands and connective regions comprises a pressure sensitive adhesive.

9. The polymeric multilayer film of Exemplary Embodiment 7, wherein the first continuous layer comprises a first pressure sensitive adhesive, and wherein the layer exhibiting a random network of strands and connective regions comprises a second pressure sensitive adhesive.

10. The polymeric multilayer film of Exemplary Embodiment 9, wherein the first pressure sensitive adhesive has more tack than the second pressure sensitive adhesive.

11. The polymeric multilayer film of Exemplary Embodiment 7, wherein the first pressure sensitive adhesive has less tack than the second pressure sensitive adhesive.

12. The polymeric multilayer film of Exemplary Embodiment 7, wherein the first continuous layer comprise at least one of a polyolefinic material (e.g., polypropylene and/or polyethylene), modified polyolefinic material, polyvinyl chloride, polycarbonate, polystyrene, polyester (including co-polyester), polylactide, polyvinylidene fluoride, (meth)acrylic (e.g., polymethyl methacrylate), urethane, acrylic urethane, ethylene vinyl acetate copolymer, acrylate-modified ethylene vinyl acetate polymer, ethylene acrylic acid copolymers, nylon, engineering polymer (e.g., a polyketone and/or polymethylpentane), or elastomer (e.g., natural rubber; synthetic rubber; styrene block copolymer containing isoprene, butadiene, or ethylene (butylene) blocks; metallocene-catalyzed polyolefin, polyurethanes; or polydiorganosiloxane).

13. The polymeric multilayer film of either Exemplary Embodiment 7 or 12, wherein the first continuous layer is a skin layer.

14. The polymeric multilayer film of any of Exemplary Embodiments 7, 12, or 13, further comprising a second layer exhibiting a random network of strands and connective regions.

15. The polymeric multilayer film of Exemplary Embodiment 14, wherein the second layer exhibiting a random network of strands and connective regions has a different random network of strands and connective regions than the first layer comprising a random network of strands and connective regions.

16. The polymeric multilayer film of Exemplary Embodiment 15, wherein the first layer exhibiting a random network of strands and connective regions is free of a pressure sensitive adhesive, and wherein the second layer exhibiting a random network of strands and connective regions comprises a pressure sensitive adhesive.

17. The polymeric multilayer film of Exemplary Embodiment 15, wherein the first layer exhibiting a random network of strands and connective regions comprises a first pressure sensitive adhesive, and wherein the second layer exhibiting a random network of strands and connective regions comprises a second, different pressure sensitive adhesive.

18. The polymeric multilayer film of Exemplary Embodiment 15, wherein the first pressure sensitive adhesive has more tack than the second pressure sensitive adhesive.

19. The polymeric multilayer film of any of Exemplary Embodiments 14 to 18, wherein the first continuous layer is disposed between the first and second layers exhibiting a random network of strands and connective regions.

20. The polymeric multilayer film of any of Exemplary Embodiments 7 to 18, further comprising a second continuous layer, wherein the first layer exhibiting a random network of strands and connective regions is disposed between the first and second continuous layers.

21. The polymeric multilayer film of any preceding Exemplary Embodiment, wherein at least one of the first or second (in some embodiments each of the first and second) major surfaces of the polymeric multilayer film exhibits a random network of strands and connective regions.

22. The polymeric multilayer film of any preceding Exemplary Embodiment having a thickness in a range from 1 micrometer to 1000 micrometers (in some embodiments, in a range from 25 micrometers to 500 micrometers, 50 micrometers to 250 micrometers, or even 2 micrometers to 10 micrometers).

23. The polymeric multilayer film of any preceding Exemplary Embodiment, further comprising at least one of a die or pigment (e.g., imparting a color such as white, yellow, green, blue, red, orange, brown, black, etc.).

24. The polymeric multilayer film of any preceding Exemplary Embodiment, further comprising at least one antistatic material.

25. The polymeric multilayer film of any preceding Exemplary Embodiment, further comprising at least one of an ink or paint receptive material.

26. The polymeric multilayer film of any preceding Exemplary Embodiment, further comprising metallic (e.g., aluminum, bronze, stainless steel, zinc, iron, tin, silver, gold, and/or titanium) particles.

27. The polymeric multilayer film of any preceding Exemplary Embodiment, further comprising a release agent.

28. The polymeric multilayer film of any preceding Exemplary Embodiment, further comprising an abrasion resistant material.

29. The polymeric multilayer film of any preceding Exemplary Embodiment, further comprising at least one of a slip or antiblock agent.

30. The polymeric multilayer film of any preceding Exemplary Embodiment, further comprising a hinder amine light stabilizer (HALS).

31. The polymeric multilayer film of any preceding Exemplary Embodiment, further comprising an UV stabilizer.

32. The polymeric multilayer film of any preceding Exemplary Embodiment, further comprising a hydrophilic material.

33. The polymeric multilayer film of any preceding Exemplary Embodiment having a machine and cross-machine direction, wherein the polymeric multilayer film is elastic in the cross-machine direction.

34. The polymeric multilayer film of any preceding Exemplary Embodiment, further comprising a liner having a major surface attached to either the first or second major surface of the polymeric multilayer film. In some embodiments, each major surface of the polymeric multilayer film has a liner attached thereto.

35. The polymeric multilayer film of Exemplary Embodiment 34, wherein the liner comprises a polymeric multilayer film exhibiting a random network of strands and connective regions.

36. The polymeric multilayer film of either Exemplary Embodiment 34 or 35, wherein the liner has a major surface exhibiting a random network of strands and connective regions.

37. The polymeric multilayer film of any of Exemplary Embodiments 34 to 36 having an adhesive (e.g., a pressure sensitive adhesive) layer on the major surface of the liner. For liners having a major surface exhibiting a random network of strands and connective regions, the major surface of the adhesive on the major surface of the liner has the inverse surface of the major surface of the liner.

38. The polymeric multilayer film of any of Exemplary Embodiments 34 to 36, wherein the first or second major surface of the polymeric multilayer film attached to the major surface of the liner is an adhesive (e.g., a pressure sensitive adhesive) surface. For liners having a major surface exhibiting a random network of strands and connective regions, the major surface of the polymeric multilayer film attached to the liner has the inverse surface of the major surface of the liner.

39. A graphic article comprising the polymeric multilayer film of any preceding of Exemplary Embodiment.

40. A tape (e.g., duct tape) comprising the polymeric multilayer film of any of Exemplary Embodiments 1 to 38.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLE 1

Figure 3:
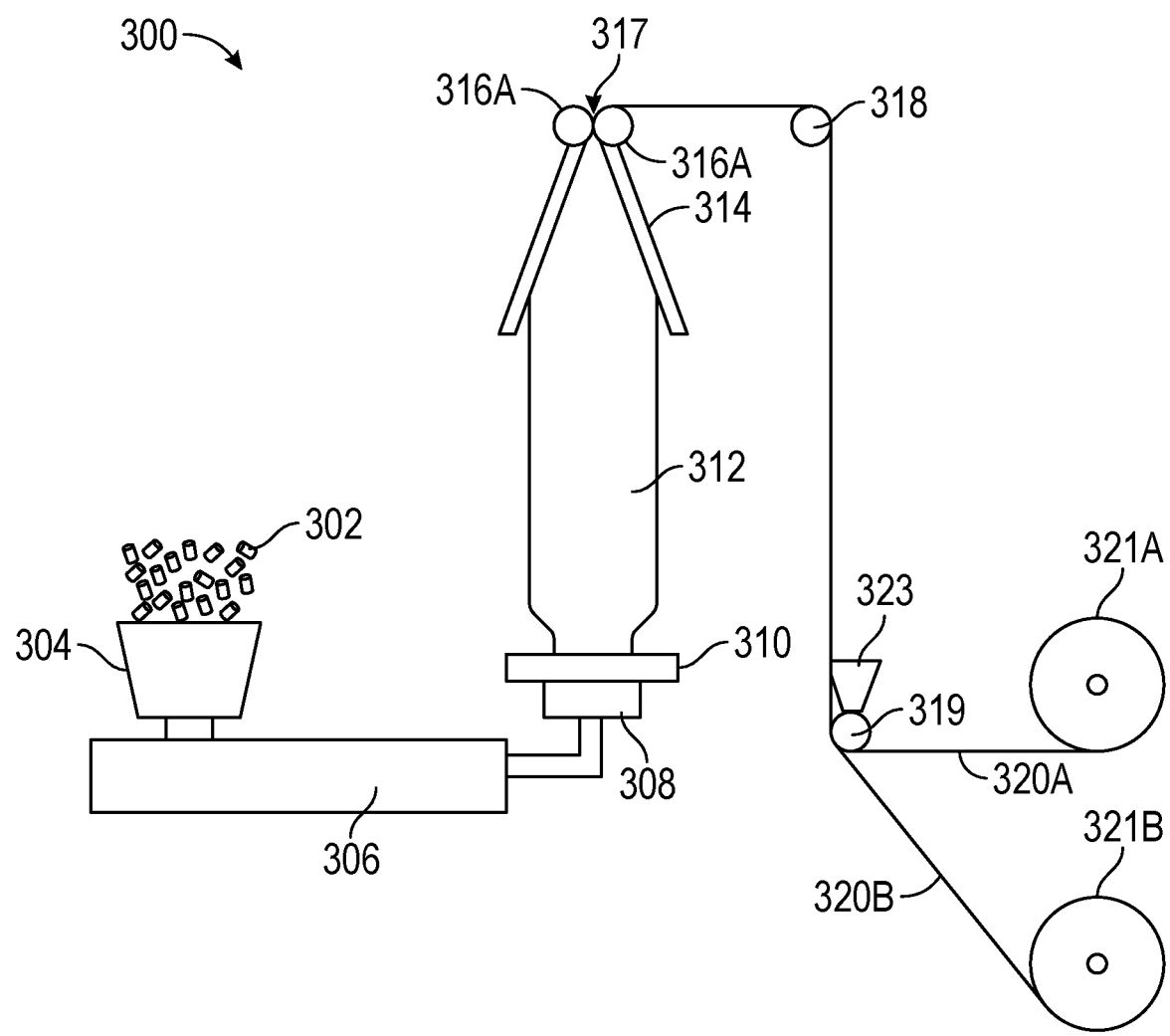
FIG. 3 is an exemplary apparatus for making polymeric multilayer film described herein.
Figure 3A:
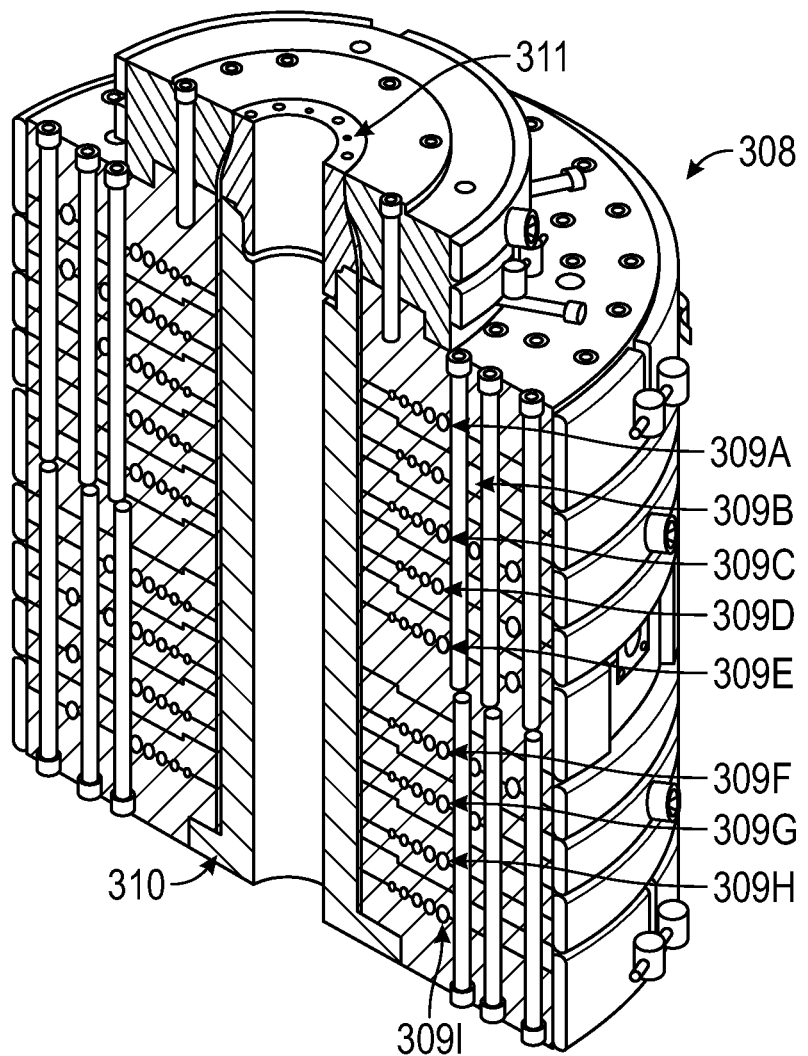
FIG. 3A is an exemplary annular die used in the apparatus shown in FIG. 3.

A seven-layer film was produced using a seven-layer annular stack die (obtained under the trade designation "COEX 7-LAYER" (Type LF-400) from Labtech Engineering, Samut Prakan, Thailand) using an apparatus as shown in FIGS. 3 and 3A, except there were only seven stacked die plates. Airflow to the die was manually controlled to achieve a blow-up ratio of about 2:1. The bubble was subsequently collapsed about 3 meters (10 feet) above the die and rolled up. The feed materials were supplied by 7 independent 20 mm diameter extruders with about a 30:1 length to diameter ratio.

A first extruder was used to melt and extrude a low-density polyethylene (obtained under the trade designation "PETROTHENE NA217000 5.6 MFI" from LyondellBasell, Houston, Tex.) into an inside channel of the annular stack die. The melt temperature was maintained at 180° C. The second, third, fourth, and fifth extruders were used to feed the same resin in subsequent outer layers of the first resin. A sixth extruder was used to feed a blend containing 96% of the same polyethylene with 4% of a chemical blowing agent (obtained under the trade designation "ECO-CELL H" from Polyfil Corp., Rockaway, N.J.). A melt temperature of 215° C. was maintained in layer 6. A seventh extruder was used to feed an identical blend as the sixth extruder to the outside layer of the annular stack die with a melt temperature of 180° C. A screw speed of 30 revolutions per minute was used. The die temperature was maintained at 180° C.

Figure 4:
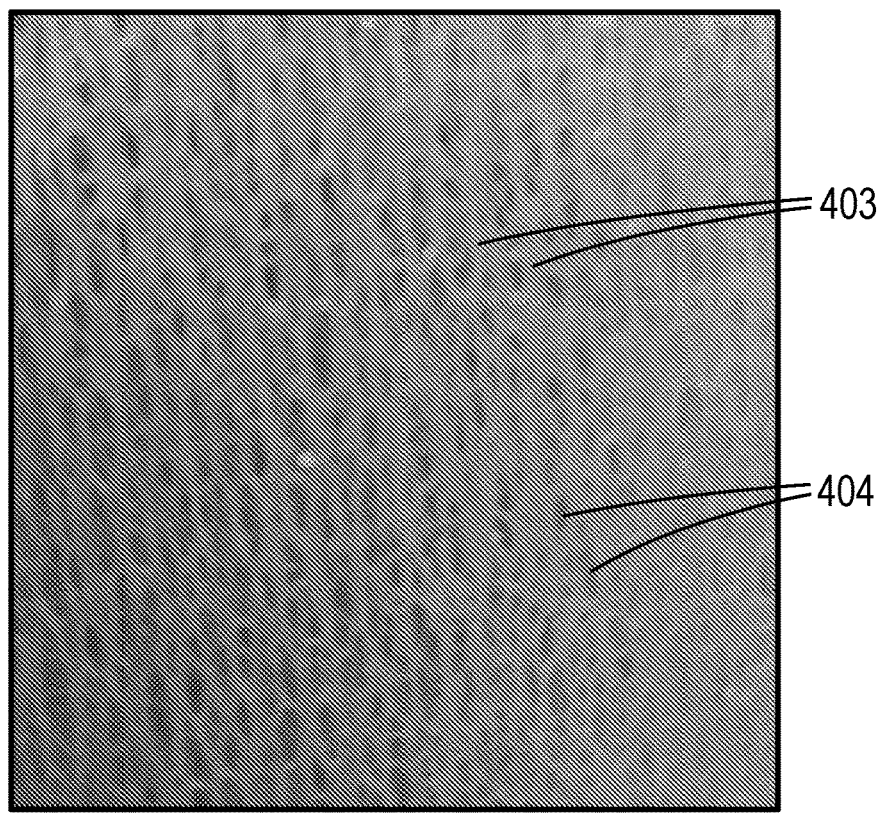
FIGS. 4 and 4A are optical images of Example 1 polymeric multilayer film.
Figure 4A:
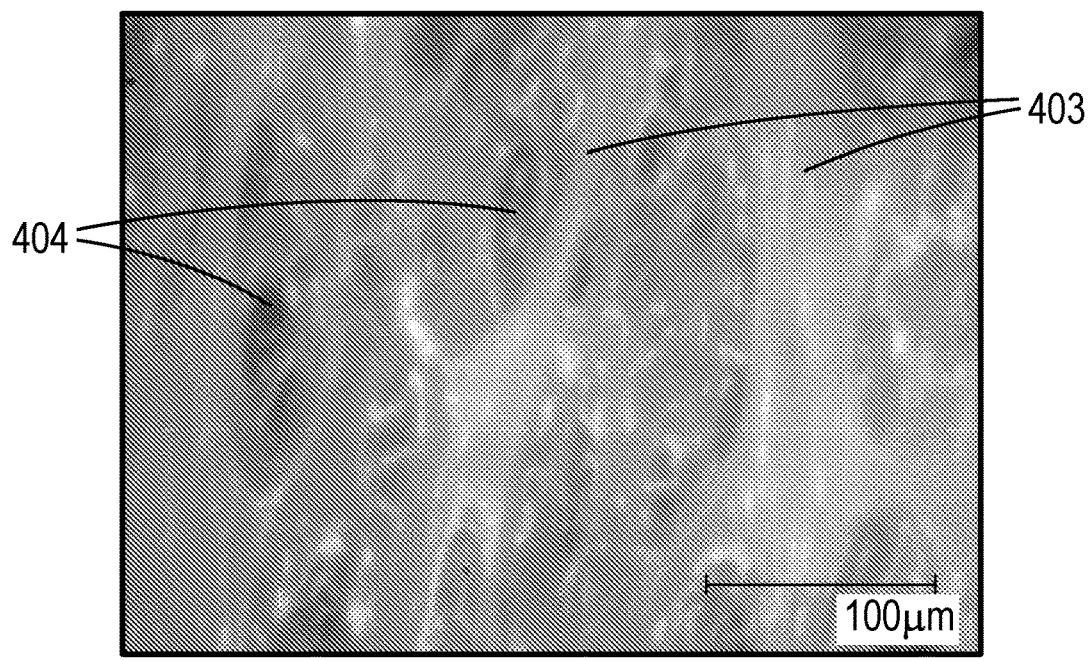

An image of the resulting polymeric multilayer film is shown in FIGS. 4 and 4A (see random network of strands 403 and connective regions 404).

EXAMPLE 2

A polymeric multilayer film was prepared as described in Example 1, except the first and second extruders contained only low-density polyethylene and the remaining extruders contained the described blend of chemical blowing agent and low-density polyethylene. For all layers containing a chemical blowing agent, a melt temperature of 215° C. was maintained. The die temperature was maintained at 180° C.

Figure 5:
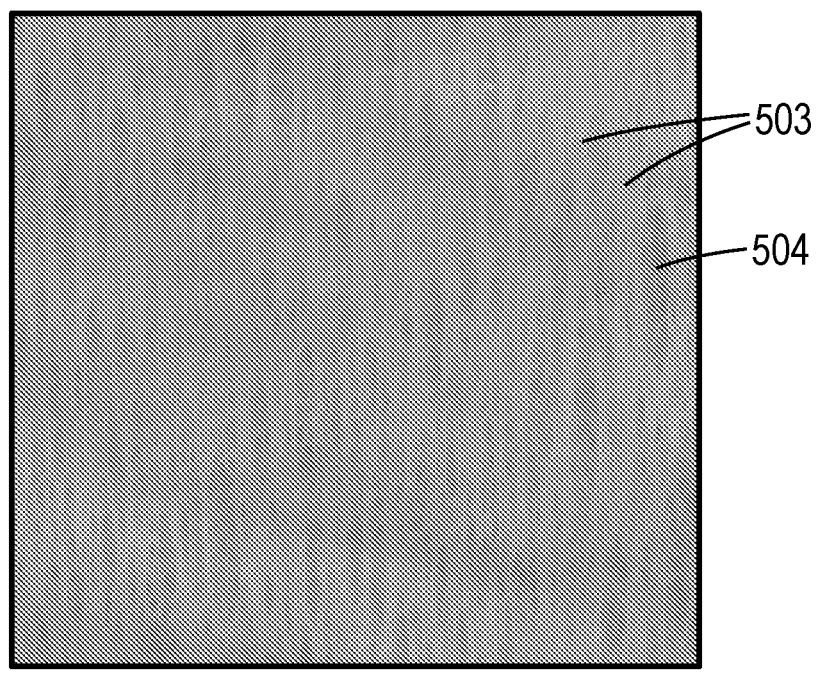
FIGS. 5 and 5A are optical images of Example 2 polymeric multilayer film.
Figure 5A:
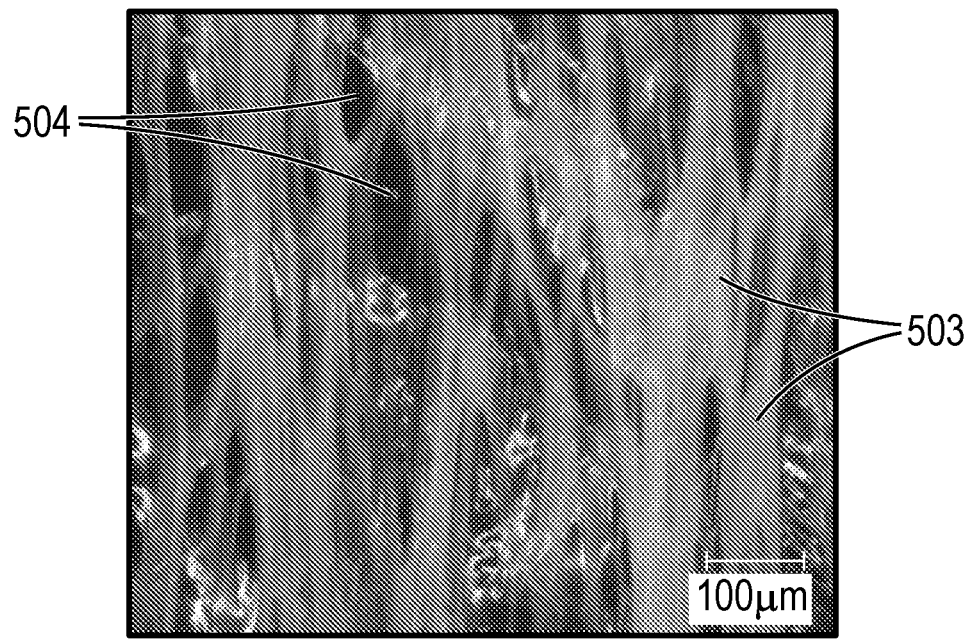

Images of the resulting polymeric multilayer film are shown in FIGS. 5 and 5A (see random network of strands 503 and connective regions 504).

EXAMPLE 3

A polymeric multilayer film was prepared as described in Example 1, except a pressure sensitive adhesive (obtained under the trade designation "KRATON MD6748" (4.8 MFI) from PolyOne, Avon Lake, Ohio) was used to blend with the chemical blowing agent.

Figure 6:
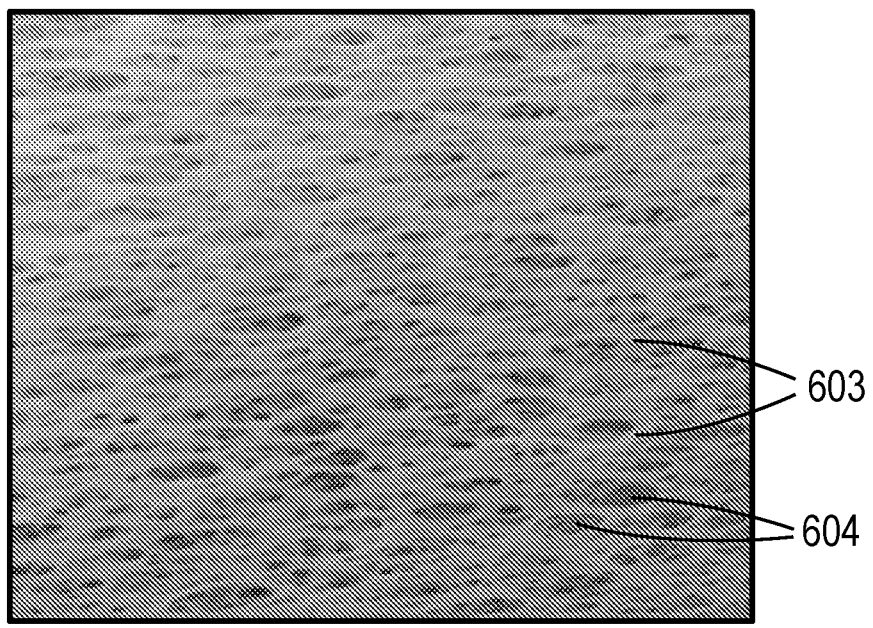
FIGS. 6 and 6A are optical images of Example 3 polymeric multilayer film.
Figure 6A:
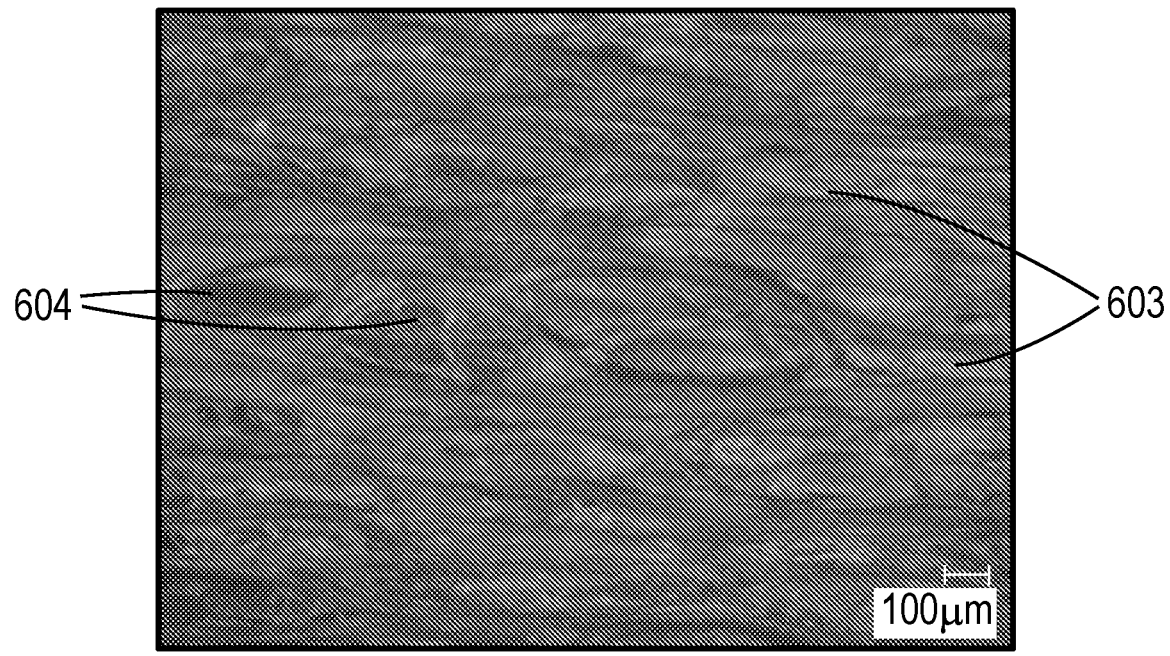

Images of the resulting polymeric multilayer film are shown in FIGS. 6 and 6A (see random network of strands 603 and connective regions 604).

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A polymeric multilayer film comprising at least two adjacent blown polymeric film layers, wherein at least some of the blown polymeric film layers comprise a random network of strands and connective regions, wherein the random network of strands has a first optical density and the connective regions have a second optical density, and wherein the first optical density is greater than the second optical density.

2. The polymeric multilayer film of claim 1, wherein at least one blown polymeric film layer has an open porosity of at least 20 percent.

3. The polymeric multilayer film of claim 1, wherein at least one blown polymeric film layer is separable from the remaining polymeric multilayer film.

4. The polymeric multilayer film of claim 1, further comprising a continuous layer, wherein the continuous layer is free of openings extending from a first major surface thereof to a second major surface thereof.

5. The polymeric multilayer film of claim 4, wherein the continuous layer is free of a pressure sensitive adhesive, and wherein at least one blown polymeric film layer comprises a pressure sensitive adhesive.

6. The polymeric multilayer film of claim 5, wherein the continuous layer comprises a first pressure sensitive adhesive, and wherein at least one blown polymeric film layer comprises a second pressure sensitive adhesive different from the first pressure sensitive adhesive.

7. The polymeric multilayer film of claim 6, wherein the continuous layer is a skin layer.

8. The polymeric multilayer film of claim 1, wherein at least one of the first or second major surfaces of the polymeric multilayer film comprises a random network of strands and connective regions.

9. The polymeric multilayer film of claim 8, further comprising a liner having a major surface attached to either the first or second major surface of the polymeric multilayer film.

10. The polymeric multilayer film of claim 9, wherein the liner has a major surface exhibiting a random network of strands and connective regions.

11. The polymeric multilayer film of claim 1 having a machine and cross-machine direction, wherein the polymeric multilayer film is elastic in the cross-machine direction.

12. A graphic article comprising the polymeric multilayer film claim 1.

13. A tape comprising the polymeric multilayer film of claim 1.

* * * * *